US012160106B2

(12) United States Patent
Yu et al.

(10) Patent No.: US 12,160,106 B2
(45) Date of Patent: Dec. 3, 2024

(54) POWER SUPPLY SYSTEM, CONVERTER, AND CIRCULATING CURRENT SUPPRESSION METHOD OF CONVERTER

(71) Applicant: Huawei Digital Power Technologies Co., Ltd., Shenzhen (CN)

(72) Inventors: Xinyu Yu, Shanghai (CN); Yuan Yao, Shanghai (CN); Fuqiang Xu, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 149 days.

(21) Appl. No.: 17/964,121

(22) Filed: Oct. 12, 2022

(65) Prior Publication Data

US 2023/0116892 A1   Apr. 13, 2023

(30) Foreign Application Priority Data

Oct. 12, 2021   (CN) .......................... 202111187171.6

(51) Int. Cl.
*H02J 3/16*    (2006.01)
*H02J 3/46*    (2006.01)
*H02M 7/49*    (2007.01)
*H02M 7/493*   (2007.01)

(52) U.S. Cl.
CPC .................. *H02J 3/16* (2013.01); *H02J 3/46* (2013.01); *H02M 7/49* (2013.01); *H02M 7/493* (2013.01)

(58) Field of Classification Search
CPC ........ H02J 3/16; H02J 3/46; H02J 3/50; H02J 3/381; H02J 2300/24; H02J 3/32; H02J 3/1821; H02M 7/49; H02M 7/493; Y02E 10/56; Y02E 40/30
See application file for complete search history.

(56) References Cited

U.S. PATENT DOCUMENTS

| 8,406,019 B2 | 3/2013 | Garces et al. |
| 2010/0067271 A1* | 3/2010 | Garces .................. H02J 3/1842 363/95 |
| 2021/0218336 A1* | 7/2021 | Shkoury ................... H02J 1/08 |

FOREIGN PATENT DOCUMENTS

| CN | 104218609 A | 12/2014 |
| CN | 104538987 A | 4/2015 |
| CN | 103346689 B | 5/2015 |
| CN | 107196543 B | 7/2018 |

(Continued)

*Primary Examiner* — Elim Ortiz
(74) *Attorney, Agent, or Firm* — Maier & Maier, PLLC

(57) ABSTRACT

A power supply system, a converter, and a circulating current suppression method of the converter. The power supply system includes at least two converters that are coupled between a direct current power supply and an alternating current grid. Each converter obtains target output reactive power when an output current of the converter starts to increase from an initial current, obtains a reactive power compensation parameter based on the three-phase output voltages. Further, each converter obtains compensated output reactive power of the converter based on the reactive power compensation parameter and adjusts actual output reactive power of the converter based on the target output reactive power and the compensated output reactive power, so that an absolute value of a difference between common-mode output voltages of any two of the at least two adjusted converters is less than a difference threshold.

18 Claims, 6 Drawing Sheets

(56) References Cited

FOREIGN PATENT DOCUMENTS

| | | | | |
|---|---|---|---|---|
| CN | 111181430 A | * | 5/2020 | |
| CN | 111181430 B | * | 4/2021 | ............... H02J 3/16 |
| CN | 112671000 A | | 4/2021 | |
| JP | 2008125323 A | | 5/2008 | |
| KR | 20170108660 A | | 9/2017 | |
| WO | 2022141365 A1 | | 7/2022 | |
| WO | 2022188063 A1 | | 9/2022 | |

* cited by examiner

POWER SUPPLY SYSTEM, CONVERTER, AND CIRCULATING CURRENT SUPPRESSION METHOD OF CONVERTER

CROSS-REFERENCE TO RELATED APPLICATION

This application claims priority to Chinese Patent Application No. 202111187171.6, filed on Oct. 12, 2021, which is hereby incorporated by reference in its entirety.

TECHNICAL FIELD

The embodiments relate to the field of power supply technologies, a power supply system, a converter, and a circulating current suppression method of the converter.

BACKGROUND

A converter is a key apparatus for converting a direct current into an alternating current. To increase a power capacity of the converter, a plurality of converters may be connected in parallel or connected through a combination of series and parallel connections to transmit higher power. However, after the plurality of converters are connected in parallel or connected through the combination of series and parallel connections, a circulating current loop is usually formed. When voltage excitation exists in the circulating current loop, a circulating current is formed in the circulating current loop.

A power supply system, shown in FIG. 1, in which two converters are connected in parallel is used as an example. Two input terminals of a converter 1 are separately connected to a direct current power supply $DC_1$ by using inductors $L_{11}$ and $L_{12}$, two input terminals of a converter 2 are separately connected to a direct current power supply $DC_2$ by using inductors $L_{21}$ and $L_{22}$, a positive input terminal of the converter 1 is connected to a positive input terminal of the converter 2 by using $L_{11}$ and $L_{21}$, a negative input terminal of the converter 1 is connected to a negative input terminal of the converter 2 by using $L_{12}$ and $L_{22}$, and an output terminal of the converter 1 and an output terminal of the converter 2 are connected to each other by using corresponding inductors $L_2+L_{cm}$ and are then connected to an alternating current grid. When a common-mode voltage of the converter 1 is different from a common-mode voltage of the converter 2, a circulating current shown in FIG. 1 is generated. The circulating current causes adverse impact such as overcurrent protection and current leakage protection of the converter, and therefore affects normal running of the power supply system.

SUMMARY

The embodiments may provide a power supply system, a converter, and a circulating current suppression method of the converter, to suppress a circulating current, thereby improving stability of the power supply system and achieving high applicability.

According to a first aspect, the embodiments may provide a power supply system. The power supply system includes at least two converters, an input terminal of the converter is coupled to a direct current power supply, and three-phase output terminals of the at least two converters are coupled to each other and are then connected to an alternating current grid. The converter obtains target output reactive power when an output current of the converter starts to increase from an initial current. The converter obtains three-phase output voltages of the converter and obtains a reactive power compensation parameter of the converter based on the three-phase output voltages. Further, the converter obtains compensated output reactive power of the converter based on the reactive power compensation parameter and adjusts actual output reactive power of the converter based on the target output reactive power and the compensated output reactive power, so that an absolute value of a difference between common-mode output voltages of any two of the at least two adjusted converters is less than a difference threshold. The reactive power compensation parameter includes a phase difference between a common-mode output current and a common-mode output voltage of the converter or a modulation ratio of the converter. Further, a common-mode output voltage of each converter that is in the power supply system and whose output terminal is connected to the alternating current grid in parallel may be indirectly adjusted by controlling actual output reactive power of the converter, to reduce a difference between common-mode output voltages of the converters that are in the power supply system and whose output terminals are connected in parallel, thereby suppressing a circulating current, improving stability of the power supply system, and achieving high applicability.

With reference to the first aspect, in a first possible implementation, when the reactive power compensation parameter is the phase difference between the common-mode output current and the common-mode output voltage of the converter, the converter obtains three-phase output currents of the converter, and obtains the common-mode output current of the converter based on the three-phase output currents; and obtains the common-mode output voltage of the converter based on the three-phase output voltages, and determines a difference between a phase of the common-mode output current and a phase of the common-mode output voltage as the phase difference.

With reference to the first aspect, in a second possible implementation, the converter obtains the compensated output reactive power based on the phase difference and the common-mode output current. In this manner, the compensated output reactive power is determined based on the common-mode output voltage and the common-mode output current of the converter. Therefore, the converter does not need to communicate with another converter or another device, to effectively avoid a case in which the compensated output reactive power cannot be determined due to a communication fault, thereby improving stability of the power supply system and achieving high applicability.

With reference to the first aspect, in a third possible implementation, the converter obtains an amplitude of the compensated output reactive power based on an effective value of the common-mode output current; and when the phase difference is greater than 0, determines that the compensated output reactive power is greater than 0; or when the phase difference is less than 0, determines that the compensated output reactive power is less than 0. It may be understood that the converter may determine, based on the phase difference between the common-mode output current and the common-mode output voltage of the converter, a comparison result of an amplitude of the common-mode output voltage of the converter and an amplitude of a common-mode output voltage of another converter connected to three-phase output terminals of the converter in parallel, control the compensated output reactive power based on the comparison result, and further indirectly adjust the common-mode output voltage by controlling the compensated output reactive power, to suppress the circulating current, thereby improving stability of the power supply system in which the converter is located.

With reference to the first aspect, in a fourth possible implementation, when the reactive power compensation parameter is the modulation ratio of the converter, the converter obtains an input voltage of the converter, determines the modulation ratio of the converter based on the input voltage and an amplitude of the three-phase output voltages, and further determines the compensated output reactive power based on the modulation ratio of the converter. In this manner, the converter may determine the compensated output reactive power through calculation or communication, so that manners are diversified and flexibility is high.

With reference to the first aspect, in a fifth possible implementation, the converter sends a compensated reactive power obtaining request to a central controller. The compensated reactive power obtaining request carries the modulation ratio of the converter. Then the converter receives the compensated output reactive power returned by the central controller. In this manner, after calculating the modulation ratio of the converter, the converter sends the compensated reactive power obtaining request to the central controller to obtain the compensated output reactive power. Therefore, a calculation amount of the converter can be effectively reduced, and processing efficiency of the converter can be improved.

With reference to the first aspect, in a sixth possible implementation, the converter obtains a first modulation ratio, and determines the compensated output reactive power based on a modulation ratio deviation between the first modulation ratio and the modulation ratio of the converter. The first modulation ratio is an average value of modulation ratios of the converter and at least one converter. The converter determines the compensated output reactive power by using the modulation ratio deviation between the modulation ratio of the converter and the average value of a modulation ratio of another converter connected to three-phase output terminals of the converter in parallel and the modulation ratio of the converter, so that accuracy of calculating the compensated output reactive power can be effectively improved, the circulating current can be further effectively suppressed, stability of the power supply system in which the converter is located can be further improved, and applicability is higher.

With reference to the first aspect, in a seventh possible implementation, the converter determines an amplitude of the compensated output reactive power based on an absolute value of the modulation ratio deviation; and when the modulation ratio deviation is greater than 0, determines that the compensated output reactive power is greater than 0; or when the modulation ratio deviation is less than 0, determines that the compensated output reactive power is less than 0. It may be understood that the converter may determine, based on the modulation ratio deviation between the modulation ratio average value and the modulation ratio of the converter, a comparison result of an amplitude of the common-mode output voltage of the converter and an amplitude of a common-mode output voltage of another converter connected to three-phase output terminals of the converter in parallel, control the compensated output reactive power based on the comparison result, and further indirectly adjust the common-mode output voltage by controlling the compensated output reactive power, to suppress the circulating current, thereby improving stability of the power supply system.

With reference to the first aspect, in an eighth possible implementation, when the converter is a primary converter in the converter and the another converter connected to the three-phase output terminals of the converter in parallel, the converter receives a modulation ratio sent by another converter, and determines the first modulation ratio based on the modulation ratio of the converter and the modulation ratio sent by the another converter.

With reference to the first aspect, in a ninth possible implementation, after determining the first modulation ratio, the converter sends the first modulation ratio to each converter connected to the three-phase output terminals of the converter in parallel.

With reference to the first aspect, in a tenth possible implementation, the converter sends a modulation ratio average value obtaining request to the central controller. The modulation ratio average value obtaining request carries the modulation ratio of the converter. Then the converter receives the first modulation ratio returned by the central controller. In this manner, after calculating the modulation ratio of the converter, the converter sends the modulation ratio average value obtaining request to the central controller to obtain the first modulation ratio. Therefore, a calculation amount of the converter can be effectively reduced, and processing efficiency of the converter can be improved.

With reference to the first aspect, in an eleventh possible implementation, the central controller is located in a primary converter in the at least two converters.

With reference to the first aspect, in a twelfth possible implementation, positive input terminals of the at least two converters are mutually coupled, and negative input terminals of the at least two converters are mutually coupled. The embodiments may be applicable to a power supply system in which a common direct current bus and a plurality of converters are connected in parallel.

With reference to the first aspect, in a thirteenth possible implementation, the at least two converters include a first primary converter and n first secondary converters corresponding to the first primary converter, the power supply system further includes a second primary converter and n second secondary converters corresponding to the second primary converter, a negative input terminal of one of the first primary converter and the n first secondary converters is connected to a positive input terminal of one of the second primary converter and the n second secondary converters, three-phase output terminals of the first primary converter and three-phase output terminals of the first secondary converters are coupled, and are then connected to the alternating current grid, three-phase output terminals of the second primary converter and three-phase output terminals of the second secondary converters are coupled, and are then connected to the alternating current grid, and n is a positive integer. The embodiments may be applicable to a power supply system with a combination of series and parallel connections.

According to a second aspect, the embodiments may provide a converter. An input terminal of the converter is coupled to a direct current power supply, and three-phase output terminals and three-phase output terminals of at least one converter are mutually coupled and are then connected to an alternating current grid. The converter obtains target output reactive power when an output current of the converter starts to increase from an initial current. Then the converter obtains three-phase output voltages of the converter and obtains a reactive power compensation parameter of the converter based on the three-phase output voltages. Further, the converter obtains compensated output reactive power of the converter based on the reactive power compensation parameter and adjusts actual output reactive power of the converter based on the target output reactive power and the compensated output reactive power. The reactive power compensation parameter includes a phase difference between a common-mode output current and a common-mode output voltage of the converter or a modulation ratio of the converter.

With reference to the second aspect, in a first possible implementation, when the reactive power compensation parameter is the phase difference between the common-mode output current and the common-mode output voltage of the converter, the converter obtains three-phase output currents of the converter, and obtains the common-mode output current of the converter based on the three-phase output currents; and determines the common-mode output voltage of the converter based on the three-phase output voltages, and determines a difference between a phase of the common-mode output current and a phase of the common-mode output voltage as the phase difference.

With reference to the second aspect, in a second possible implementation, the converter obtains the compensated output reactive power based on the phase difference and the common-mode output current.

With reference to the second aspect, in a third possible implementation, the converter determines an amplitude of the compensated output reactive power based on an effective value of the common-mode output current; and when the phase difference is greater than 0, determines that the compensated output reactive power is greater than 0; or when the phase difference is less than 0, determines that the compensated output reactive power is less than 0.

With reference to the second aspect, in a fourth possible implementation, when the reactive power compensation parameter is the modulation ratio of the converter, the converter obtains an input voltage of the converter, and determines the modulation ratio of the converter based on the input voltage and an amplitude of the three-phase output voltages.

With reference to the second aspect, in a fifth possible implementation, the converter obtains a first modulation ratio, and determines the compensated output reactive power based on a modulation ratio deviation between the first modulation ratio and the modulation ratio of the converter. The first modulation ratio is an average value of modulation ratios of the converter and the at least one converter.

With reference to the second aspect, in a sixth possible implementation, the converter determines an amplitude of the compensated output reactive power based on an absolute value of the modulation ratio deviation; and when the modulation ratio deviation is greater than 0, determines that the compensated output reactive power is greater than 0; or when the modulation ratio deviation is less than 0, determines that the compensated output reactive power is less than 0.

According to a third aspect, the embodiments may provide a circulating current suppression method of a converter. An input terminal of the converter is coupled to a direct current power supply, and three-phase output terminals and three-phase output terminals of at least one converter are mutually coupled and are then connected to an alternating current grid. The method includes: The converter obtains target output reactive power when an output current of the converter starts to increase from an initial current. Then, the converter obtains three-phase output voltages of the converter and obtains a reactive power compensation parameter of the converter based on the three-phase output voltages.

Further, the converter obtains compensated output reactive power of the converter based on the reactive power compensation parameter and adjusts actual output reactive power of the converter based on the target output reactive power and the compensated output reactive power. The reactive power compensation parameter includes a phase difference between a common-mode output current and a common-mode output voltage of the converter or a modulation ratio of the converter.

With reference to the third aspect, in a first possible implementation, when the reactive power compensation parameter is the phase difference between the common-mode output current and the common-mode output voltage of the converter, the converter obtains three-phase output currents of the converter, and obtains the common-mode output current of the converter based on the three-phase output currents; and determines the common-mode output voltage of the converter based on the three-phase output voltages, and determines a difference between a phase of the common-mode output current and a phase of the common-mode output voltage as the phase difference.

With reference to the third aspect, in a second possible implementation, the converter obtains the compensated output reactive power based on the phase difference and the common-mode output current.

With reference to the third aspect, in a third possible implementation, the converter determines an amplitude of the compensated output reactive power based on an effective value of the common-mode output current; and when the phase difference is greater than 0, determines that the compensated output reactive power is greater than 0; or when the phase difference is less than 0, determines that the compensated output reactive power is less than 0.

With reference to the third aspect, in a fourth possible implementation, when the reactive power compensation parameter is the modulation ratio of the converter, the converter obtains an input voltage of the converter, and determines the modulation ratio of the converter based on the input voltage and an amplitude of the three-phase output voltages.

With reference to the third aspect, in a fifth possible implementation, the converter obtains a first modulation ratio, and determines the compensated output reactive power based on a modulation ratio deviation between the first modulation ratio and the modulation ratio of the converter. The first modulation ratio is an average value of modulation ratios of the converter and the at least one converter.

With reference to the third aspect, in a sixth possible implementation, the converter determines an amplitude of the compensated output reactive power based on an absolute value of the modulation ratio deviation; and when the modulation ratio deviation is greater than 0, determines that the compensated output reactive power is greater than 0; or when the modulation ratio deviation is less than 0, determines that the compensated output reactive power is less than 0.

It should be understood that implementations and beneficial effects of the plurality of aspects of the embodiments may be mutually referenced.

DETAILED DESCRIPTION OF THE EMBODIMENTS

A power supply system may be applicable to different scenarios such as photovoltaic-energy storage hybrid power supply scenario and an energy storage power supply scenario. In the photovoltaic-energy storage hybrid power supply scenario, a direct current power supply includes a photovoltaic string and an energy storage battery string. The photovoltaic string may be coupled to an input terminal of an inverter, in other words, the photovoltaic string may be directly connected to the input terminal of the inverter, or the photovoltaic string may be indirectly connected to an input terminal of an inverter by using a component (for example, an inductor) or a device (for example, a DC/DC converter), and the energy storage battery string is coupled to an input terminal of the converter. In the energy storage power supply scenario, a direct current power supply is an energy storage battery string, and the energy storage battery string is coupled to an input terminal of a converter. The following uses the energy storage power supply scenario as an example for description.

Figure 1:
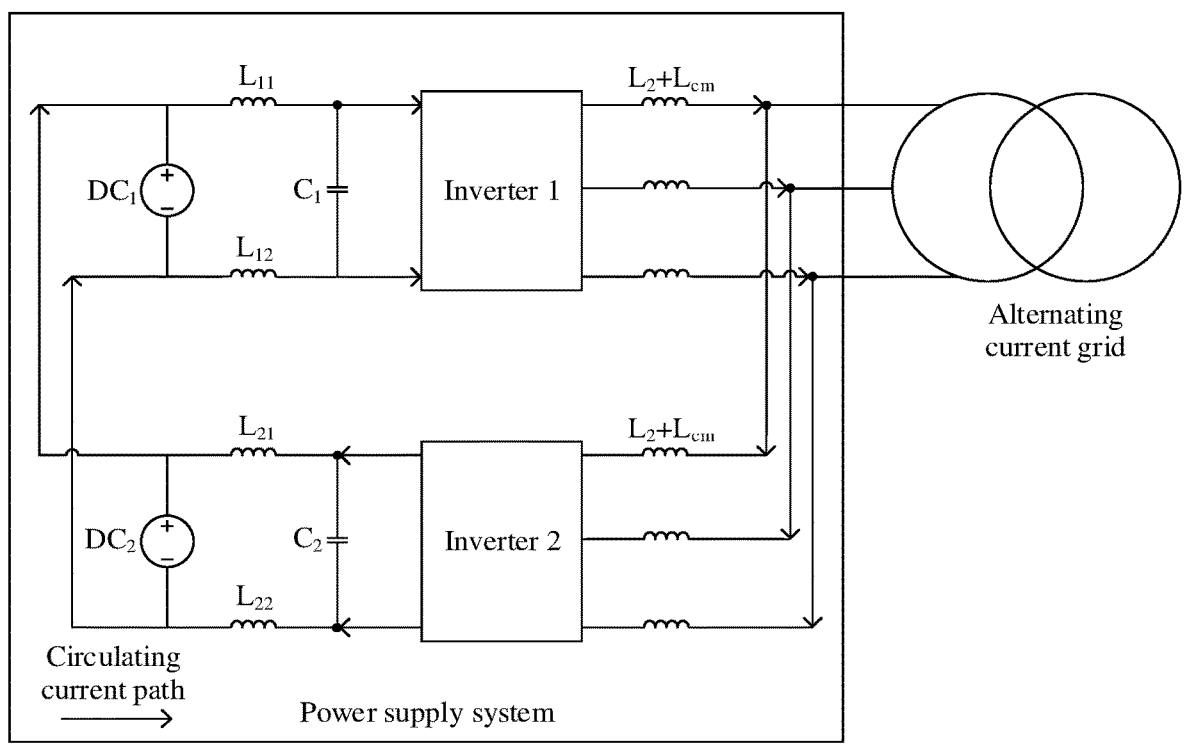
FIG. 1 is a schematic diagram of a structure of a power supply system according to the conventional technology.
Figure 2:
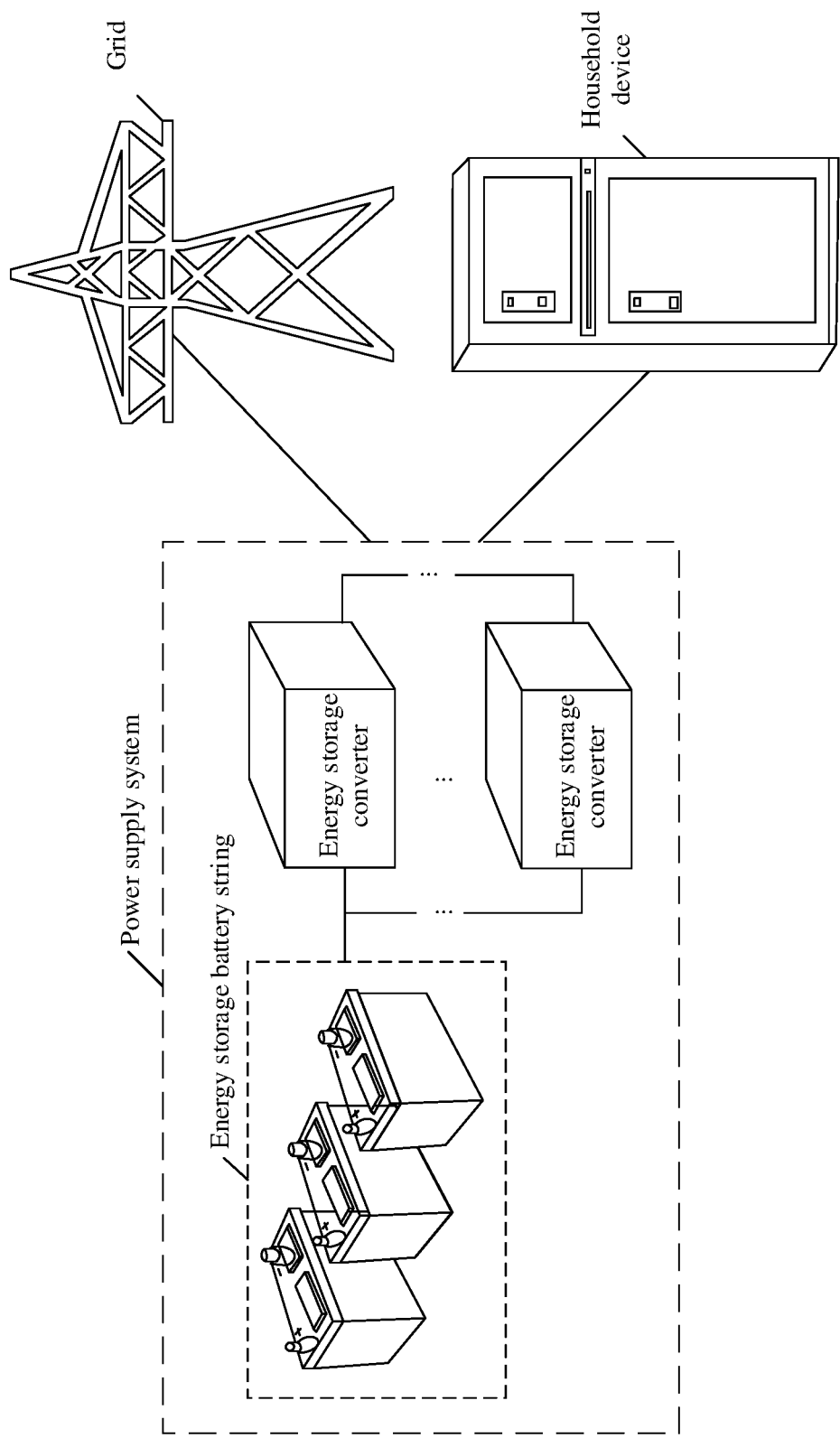
FIG. 2 is a schematic diagram of an application scenario of a power supply system.

FIG. 2 is a schematic diagram of an application scenario of a power supply system. In the energy storage power supply scenario, the power supply system may include an energy storage battery string and a plurality of power conversion systems. The converter may be applicable to the power conversion system in the power supply system shown in FIG. 2. Input terminals of the plurality of power conversion systems are connected to a same energy storage battery string in parallel, and output terminals of the plurality of power conversion systems are connected to an alternating current grid or a household device in parallel. Optionally, in the energy storage power supply scenario, an input terminal of one power conversion system may be connected to one energy storage battery string, and input terminals of a plurality of power conversion systems are connected in parallel. The energy storage battery string herein may include at least one battery cluster, all battery clusters are connected in parallel, and one battery cluster may include a plurality of battery groups connected in series. The battery group may be one battery pack, and one battery pack may include one or more battery units (a voltage of the battery unit usually falls between 2.5 V and 4.2 V) that are connected through a combination of series and parallel connections, to form a minimum energy storage and management unit. After the power supply system starts to run, the power conversion system may invert a direct current in the energy storage battery string connected to the input terminal of the power conversion system to an alternating current, to supply power to various types of electrical devices such as the alternating current grid or an alternating load (for example, a home appliance). Each power conversion system in the power supply system can indirectly adjust a corresponding common-mode output voltage by controlling corresponding compensated output reactive power of the power conversion system, to reduce a difference between common-mode output voltages of the power conversion systems whose output terminals are connected in parallel in the power supply system and suppress a circulating current, thereby improving stability of the power supply system and achieving high applicability.

The foregoing is merely an example of the application scenario of the power supply system, but is not exhaustive. The application scenario is not limited.

Figure 3:
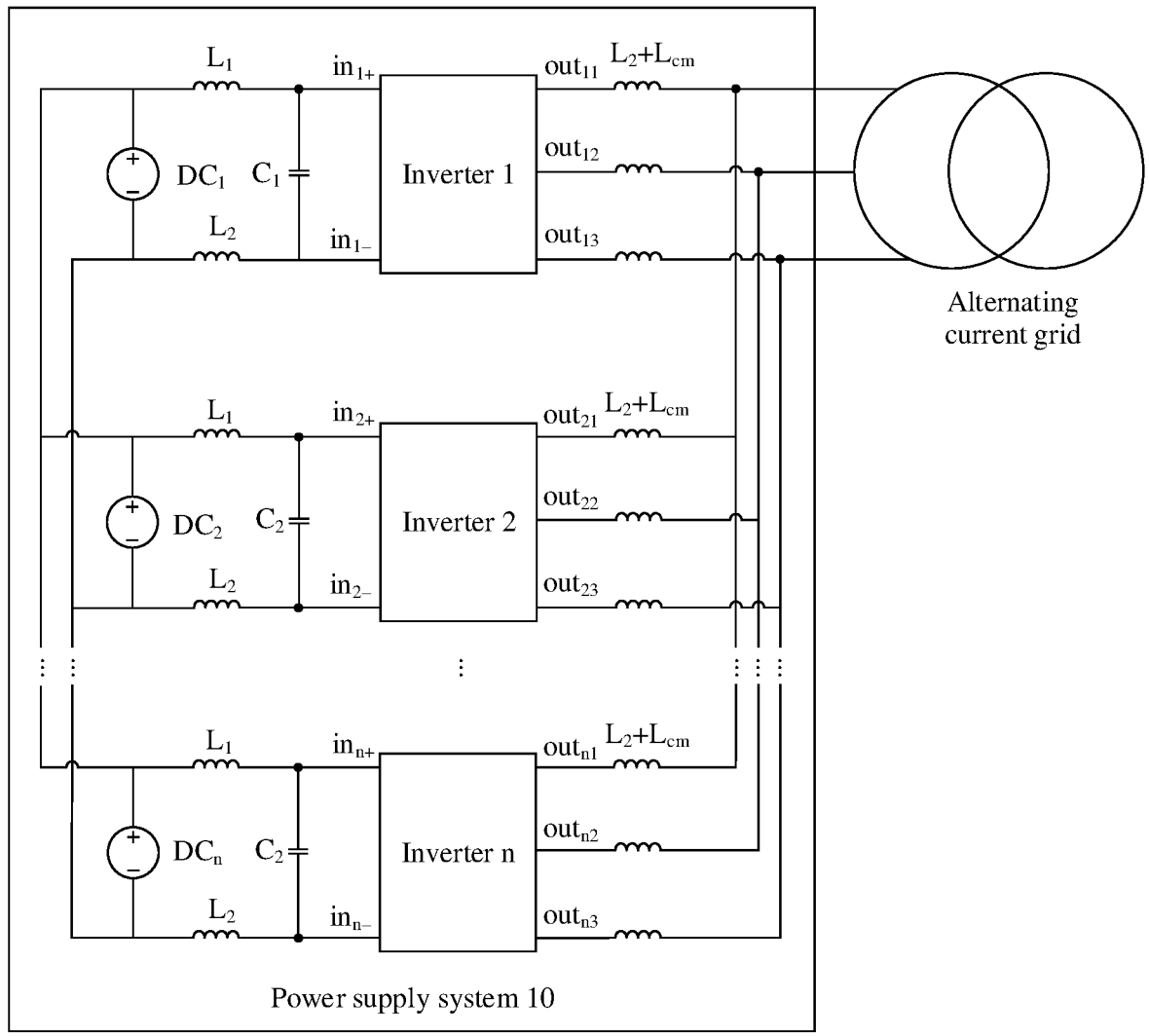
FIG. 3 is a schematic diagram of a structure of a power supply system.
Figure 4A:
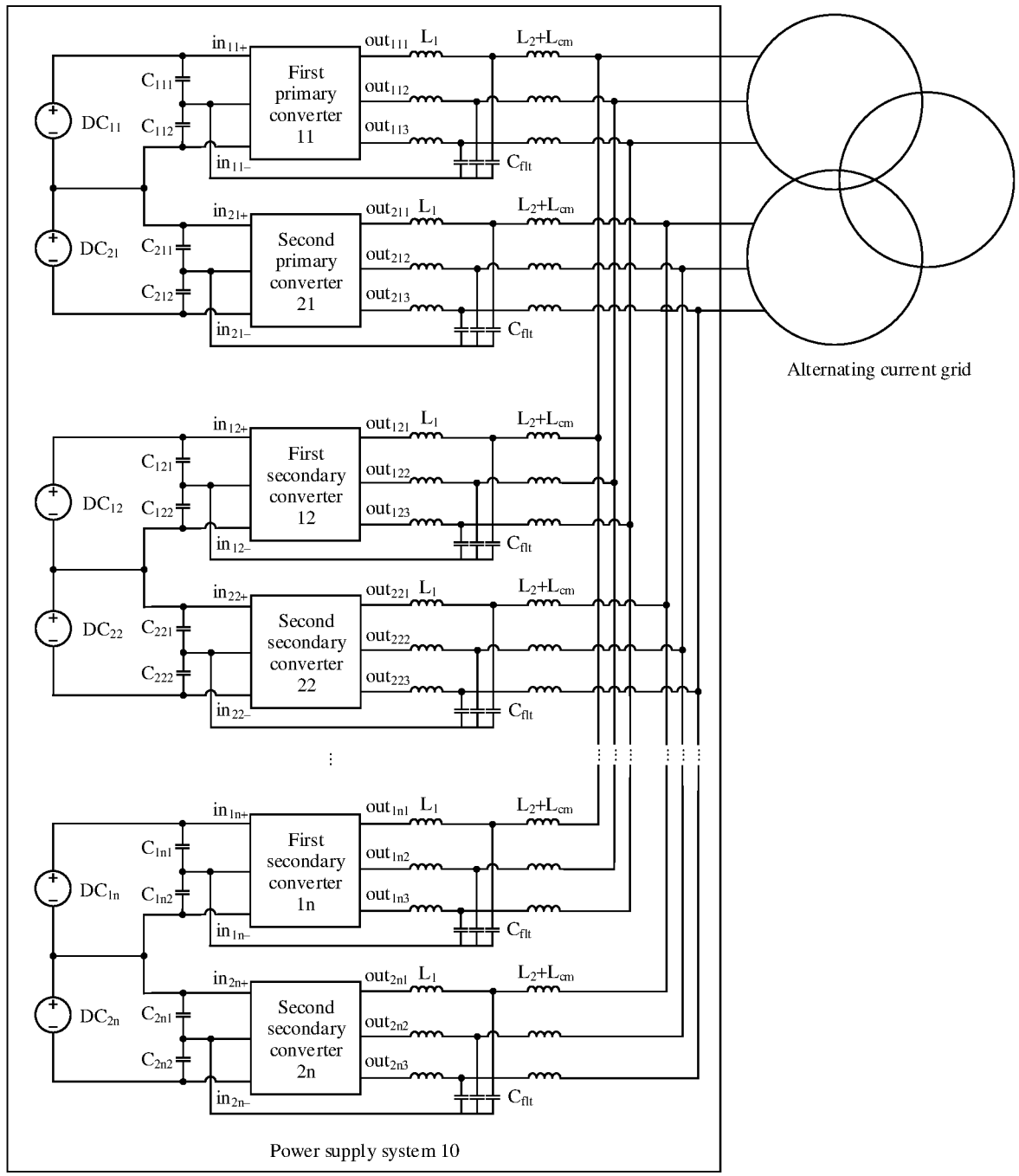
FIG. 4a is a schematic diagram of another structure of a power supply system.
Figure 4B:
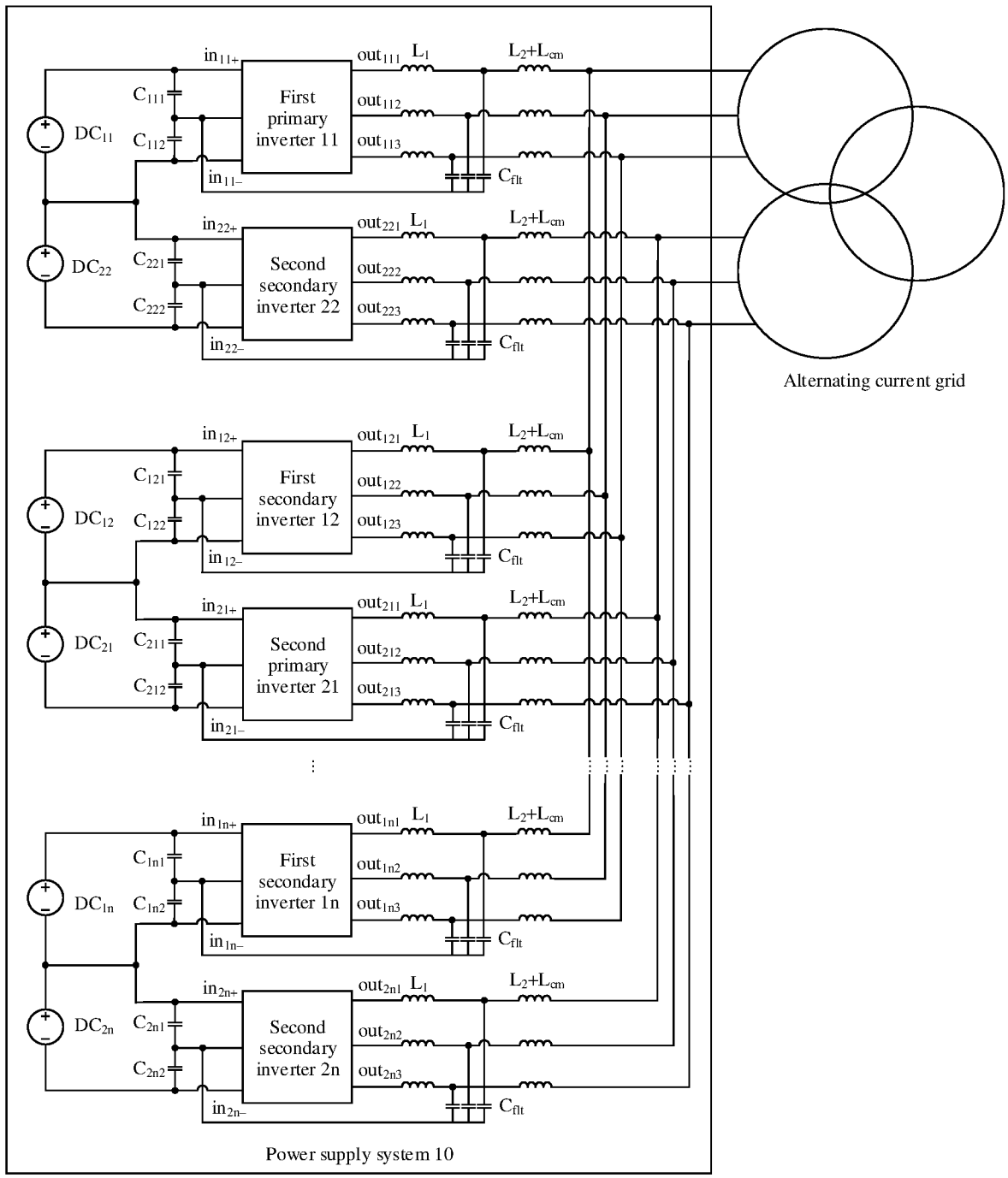
FIG. 4b is a schematic diagram of still another structure of a power supply system.

With reference to FIG. 3 to FIG. 4b, the following uses examples to describe a working principle of a converter.

FIG. 3 is a schematic diagram of a structure of a power supply system. As shown in FIG. 3, a power supply system 10 is a power supply system in which a common direct current bus and a plurality of converters are connected in parallel. The power supply system 10 includes a converter 1, a converter 2, . . . , and a converter n, where n is an integer greater than or equal to 2. A positive input terminal $in_{1+}$ and a negative input terminal $in_{1-}$ of the converter 1 are respectively connected to a direct current power supply $DC_1$ by using inductors $L_1$ and $L_2$, a positive input terminal $in_{2+}$ and a negative input terminal $in_{2-}$ of the converter 2 are respectively connected to a direct current power supply $DC_2$ by using inductors $L_1$ and $L_2$, . . . , and a positive input terminal $in_{n+}$ and a negative input terminal $in_{n-}$ of the converter n are respectively connected to a direct current power supply $DC_n$ by using inductors $L_1$ and $L_2$. The positive input terminal $in_{2+}$ of the converter 2 is connected to the positive input terminal $in_{1+}$ of the converter 1 by using two $L_1$, . . . , and the positive input terminal $in_{n+}$ of the converter n is connected to the positive input terminal $in_{1+}$ of the converter 1 by using two $L_1$. The negative input terminal $in_{2-}$ of the converter 2 is connected to the negative input terminal $in_{1-}$ of the converter 1 by using two $L_2$, . . . , and the negative input terminal $in_{n-}$ of the converter n is connected to the negative input terminal $in_{1-}$ of the converter 1 by using two $L_2$. In other words, the input terminals of the converter 1, the converter 2, . . . , and the converter n are connected in parallel. Three-phase output terminals (namely, $out_{11}$, $out_{12}$, and $out_{13}$) of the converter 1, three-phase output terminals (namely, $out_{21}$, $out_{22}$, and $out_{23}$) of the converter 2, . . . , and three-phase output terminals (namely, $out_{n1}$, $out_{n2}$, and $out_{n3}$) of the converter n are connected in parallel to an alternating current grid by using inductors $L_2 + L_{cm}$.

In an optional implementation, after the power supply system 10 starts to work, output currents of the converter 1, the converter 2, . . . , and the converter n all start to increase from initial currents (for example, 0), and a power scheduling center sends power scheduling instructions to the converter 1, the converter 2, . . . , and the converter n. The converter 1, the converter 2, . . . , and the converter n receive the power scheduling instructions. The power scheduling instruction carries target output reactive power. Optionally, after receiving a power scheduling instruction, each of the n converters may determine target output reactive power of the converter based on a preset mapping relationship between a power scheduling instruction and target output reactive power. For example, if a power scheduling instruction received by the converter 1 is a level-1 power scheduling instruction, the converter 1 may learn, based on the level-1 power scheduling instruction and the preset mapping relationship, that target output reactive power of the converter 1 is 20 W. Optionally, when an output current of each of the n converters starts to increase from 0, the converter may obtain corresponding target output reactive power by reading a corresponding preset configuration parameter. Because each converter in the power supply system 10 can suppress a circulating current by controlling output reactive power, the following uses the converter 1 as an example for description.

When an output current of the converter 1 starts to increase from an initial current, the converter 1 obtains current three-phase output voltages, namely, a voltage Vout11 of the terminal $out_{11}$, a voltage Vout12 of the terminal $out_{12}$, and a voltage Vout13 of the terminal $out_{13}$, of the converter 1. The converter 1 determines a reactive power compensation parameter of the converter 1 based on Vout11, Vout12, and Vout13, obtains compensated output reactive power $Q_{add}$ of the converter 1 based on the reactive power compensation parameter of the converter 1, and further adjusts actual output reactive power $Q_{final}$ the converter 1 based on the target output reactive power $Q_{cmd}$ and the compensated output reactive power $Q_{add}$. The reactive power compensation parameter of the converter 1 includes a phase difference between a common-mode output current and a common-mode output voltage of the converter 1 or a modulation ratio of the converter 1.

In an optional embodiment, when the output current of the converter 1 starts to increase from the initial current, the converter 1 obtains Vout11, Vout12, and Vout13, and after obtaining Vout11, Vout12, and Vout13, the converter 1 continues to obtain current three-phase output currents, namely, a current Iout11 of the terminal $out_{11}$, a current Iout12 of the terminal $out_{12}$, and a current Iout13 of the terminal $out_{13}$, of the converter 1. The converter 1 determines the common-mode output voltage Vcmv=(Vout11+Vout12+Vout13)/3=$A_1$ $\sin(\omega_1 t+\theta_1)$ of the converter 1 based on Vout11, Vout12, and Vout13, determines the common-mode output current Icmv=(Iout11+Iout12+Iout13)/3=$A_2$ $\sin(\omega_2 t+\theta_2)$ of the converter 1 based on Iout11, Iout12, and Iout13, and further determines $Q_{add}$ based on the phase difference $\theta_2-\theta_1$ between Icmv and Vcmv and Icmv. Both $\omega_1$ and $\omega_2$ are three times a utility frequency, and the utility frequency is a working frequency of the alternating current grid.

After the converter 1 calculates Icmv and Vcmv, the converter 1 may determine, based on an effective value (that is, $A_1/\sqrt{2}$) of Icmv and a first preset coefficient $k_{cir}$, that an amplitude of $Q_{add}$ is $|k_{cir}*A_1/\sqrt{2}|$, where $k_{cir}$ is a proportional coefficient between the compensated output reactive power and the common-mode output current. When $\theta_2-\theta_1>0$, it indicates that a phase of Icmv leads a phase of Vcmv, in other words, an amplitude of the common-mode output voltage of the converter 1 is less than amplitudes of common-mode output voltages of other converters (namely, the converter 2, . . . , and the converter n) connected to the three-phase output terminals of the converter 1 in parallel. In this case, the converter 1 determines $Q_{add}=|k_{cir}*A_1/\sqrt{2}|$, so that $Q_{add}$ is made greater than 0 to increase the actual output reactive power of the converter 1 and further increase the common-mode output voltage of the converter 1. When $\theta_2-\theta_1<0$, it indicates that a phase of Icmv lags behind a phase of Vcmv, in other words, an amplitude of the common-mode output voltage of the converter 1 is greater than amplitudes of common-mode output voltages of other converters. In this case, the converter 1 determines $Q_{add}=|k_{cir}*A_1/\sqrt{2}|$, so that $Q_{add}$ can be made less than 0 to reduce the actual output reactive power of the converter 1 and further reduce the common-mode output voltage of the converter 1.

In this manner, the compensated output reactive power is determined based on the common-mode output voltage and the common-mode output current of the converter 1. Therefore, the converter 1 does not need to communicate with another converter or another device, to effectively avoid a case in which the compensated output reactive power cannot be determined due to a communication fault, thereby improving stability of the converter 1 during working and achieving high applicability.

Then the converter 1 determines the actual output reactive power $Q_{final}=Q_{cmd}+Q_{add}$ of the converter 1 based on the target output reactive power $Q_{cmd}$ and the compensated output reactive power $Q_{add}$ and adjusts a differential-mode output voltage of the converter 1, so that final actual output reactive power of the converter 1 is $Q_{final}$.

It may be understood that each converter in the power supply system 10 may determine, based on a phase difference between a common-mode output current and a common-mode output voltage of the converter, a comparison result of an amplitude of the common-mode output voltage of the converter and an amplitude of a common-mode output voltage of another converter connected to three-phase output terminals of the converter in parallel, control compensated output reactive power based on the comparison result, and further indirectly adjust, by controlling the compensated output reactive power, the common-mode output voltage to suppress a circulating current. In addition, because a sum of compensated output reactive power of all the converters in the power supply system 10 is less than a first reactive power threshold, total output reactive power of the power supply system 10 is not affected or impact on total output reactive power of the power supply system 10 can be ignored, so that stability of the power supply system 10 can be improved. In addition, in this embodiment, the converter 1 indirectly adjusts the common-mode output voltage of the converter 1 by controlling the compensated output reactive power, to suppress a circulating current. Therefore, compared with a manner in which the common-mode output voltage is directly modified to suppress the circulating current, in this manner, a common-mode voltage injection policy does not need to be modified, so that validity of a discontinuous pulse width modulation (DPWM) common-mode injection policy can be ensured, thereby reducing a switching loss of the converter 1.

In another optional embodiment, when the output current of the converter 1 starts to increase from the initial current, the converter 1 obtains Vout11, Vout12, and Vout13, and after obtaining Vout11, Vout12, and Vout13, the converter 1 continues to obtain a current input voltage, namely, a voltage Vin1 between the terminal $in_{1+}$ and the terminal of the converter 1. The converter 1 calculates an amplitude Vamp=$\sqrt{2(Vout11^2+Vout12^2+Vout13^2)/3}$ of the three-phase output voltages based on Vout11, Vout12, and Vout13, calculates the modulation ratio $m_1=2Vamp/Vin1$ of the converter 1 based on Vin1 and Vamp, and further determines the compensated output reactive power $Q_{add}$ based on $m_1$. After the converter 1 calculates $m_1$, the converter 1 may obtain a first modulation ratio $m_{avg}$, and determines $Q_{add}$ based on a modulation ratio deviation $\Delta m_1=m_{avg}-m_1$ between $m_{avg}$ and $m_1 \cdot m_{avg}$ is an average value of a modulation ratio (namely, a modulation ratio $m_2$ of the converter 2, . . . , and a modulation ratio $m_n$ of the converter n) of at least one converter connected to the three-phase output terminals of the converter 1 in parallel and the modulation ratio $m_1$ of the converter 1.

The converter 1 may obtain $m_{avg}$ in the following manner.

When the converter 1 is a primary converter in the converter 1, . . . , and the converter n, the converter 2, . . . , and the converter n send modulation ratio average value obtaining requests to the converter 1 after calculating corresponding modulation ratios. The converter 1 receives a modulation average ratio obtaining request sent by the converter 2, where the modulation ratio obtaining request carries the modulation ratio $m_2$ of the converter 2, . . . , and the converter 1 receives a modulation ratio average value obtaining request sent by the converter n, where the modulation ratio average value obtaining request carries the modulation ratio $m_n$ of the converter n. The converter 1 calculates the first modulation ratio $m_{avg}=(m_1+m_2+ \ldots +m_n)/n$ based on $m_1, m_2, \ldots,$ and $m_n$, and returns $m_{avg}$ to the converter 2, . . . , and the converter n.

When the converter 1 is a secondary converter in the converter 1, . . . , and the converter n, the converter n is a primary converter in the converter 1, . . . , and the converter n, and a central controller is located in the converter n, after calculating the modulation ratio $m_1$ of the converter 1, the converter 1 sends a modulation ratio average value obtaining request to the converter n. The modulation ratio average value obtaining request carries the modulation ratio $m_1$ of the converter 1. When receiving modulation ratio average value obtaining requests sent by the converter 2, . . . , and the converter (n-1), the converter n calculates the first modulation ratio $m_{avg}=(m_1+m_2+ \ldots +m_n)/n$ based on the modulation ratio $m_n$ of the converter n and the modulation ratio $m_1$ of the converter 1, . . . , and the modulation ratio $m_{n-1}$ of the converter (n-1) that are carried in the modulation ratio average value obtaining requests sent by the other converters, and returns $m_{avg}$ to the converter 1, . . . , and the converter (n-1). The converter 1 receives the first modulation ratio $m_{avg}$ returned by the converter n. It may be understood that obtaining the first modulation ratio through communication can reduce a calculation workload of each secondary converter, to improve processing efficiency of each secondary converter.

When all of the converter 1, . . . , and the converter n obtain $m_{avg}$ by communicating with a central controller, after calculating the modulation ratio $m_1$ of the converter 1, the converter 1 sends a modulation ratio average value obtaining request to the central controller. The modulation ratio average value obtaining request carries the modulation ratio $m_1$ of the converter 1. When receiving modulation ratio average value obtaining requests sent by the converter 1, . . . , and the converter n, the central controller calculates the first modulation ratio $m_{avg}=(m_1+m_2+ \ldots +m_n)/n$ based on the modulation ratio $m_1$ of the converter 1, . . . , and the modulation ratio $m_n$ of the converter n that are carried in the modulation ratio average value obtaining requests sent by the n converters, and returns $m_{avg}$ to the converter 1, . . . , and the converter n. The converter 1 receives the first modulation ratio $m_{avg}$ returned by the central controller. The central controller herein is located in another device independent of the converter 1, . . . , and the converter n. It may be understood that obtaining the first modulation ratio through communication can reduce a calculation workload of each converter, to improve processing efficiency of each converter.

Optionally, the first modulation ratio may be preset in each converter, to avoid a case in which the first modulation ratio cannot be determined due to a communication fault, so that stability of the converter during working is improved and applicability is high.

Then the converter 1 calculates a modulation ratio deviation $\Delta m_1 = m_{avg} - m_1$ between $m_{avg}$ and $m_1$ and determines that an amplitude of $Q_{add}$ is $|k_{mod}*\Delta m_1|$ based on $\Delta m_1$ and a second preset coefficient $k_{mod}$, where $k_{mod}$ is a proportional coefficient between the compensated output reactive power and the modulation ratio deviation. When $\Delta m_1 > 0$, it indicates that an amplitude of the common-mode output voltage of the converter 1 is less than amplitudes of common-mode output voltages of other converters connected to the three-phase output terminals of the converter 1 in parallel. In this case, the converter 1 determines $Q_{add}=|k_{mod}*\Delta m_1|$, so that $Q_{add}$ can be made greater than 0 to increase the actual output reactive power of the converter 1 and further increase the common-mode output voltage of the converter 1. When $\Delta m_1 < 0$, it indicates that an amplitude of the common-mode output voltage of the converter 1 is greater than amplitudes of common-mode output voltages of other converters. In this case, the converter 1 determines $Q_{add}=-|k_{mod}*\Delta m_1|$, so that $Q_{add}$ can be made less than 0 to reduce the actual output reactive power of the converter 1 and further reduce the common-mode output voltage of the converter 1.

It may be understood that the converter 1 may determine, based on a modulation ratio deviation between the modulation ratio average value and the modulation ratio of the converter 1, a comparison result of the amplitude of the common-mode output voltage of the converter 1 and the amplitudes of the common-mode output voltages of the other converters connected to the three-phase output terminals of the converter 1 in parallel, control the compensated output reactive power based on the comparison result, and further indirectly adjust the common-mode output voltage by controlling the compensated output reactive power, to suppress the circulating current. Because the compensated output reactive power in this manner is determined based on the modulation ratio deviation between the modulation ratio average value and the modulation ratio of the converter 1, accuracy of calculating the compensated output reactive power by the converter 1 can be effectively improved, the circulating current can be further effectively suppressed, stability of the power supply system 10 can be further improved, and applicability is higher.

Optionally, the converter 1 may obtain the compensated output reactive power $Q_{add}$ of the converter 1 by communicating with the central controller: After calculating the modulation ratio $m_1$ of the converter 1, the converter 1 sends a compensated reactive power obtaining request to the central controller. The compensated reactive power obtaining request carries the modulation ratio $m_1$ of the converter 1. After receiving compensated reactive power obtaining requests sent by the converter 1, . . . , and the converter n, the central controller calculates the first modulation ratio $m_{avg}=(m_1+m_2+ \ldots +m_n)/n$ based on the modulation ratio $m_1$ of the converter 1, the modulation ratio $m_2$ of the converter 2, . . . , and the modulation ratio $m_n$ of the converter n that are carried in the compensated reactive power obtaining requests sent by the converter 1, . . . , and the converter n, and calculates compensated output reactive power of each converter based on a second preset coefficient $k_{mod}$ and modulation ratio deviations, namely, $\Delta m_1, \ldots,$ and $\Delta m_n$, between the first modulation ratio $m_{avg}$ and the modulation ratio $m_1$ of the converter 1, . . . , and the modulation ratio $m_n$ of the converter n. Herein, for an implementation in which the central controller determines the compensated output reactive power of each converter based on a modulation ratio deviation of each converter and the second preset coefficient $k_{mod}$, refer to the manner in which the converter 1 determines $Q_{add}$ based on $\Delta m_1$ and the second preset coefficient $k_{mod}$ in the previous embodiment. Details are not described herein again. Then, the central controller returns the compensated output reactive power of each converter to each converter. The converter 1 receives the compensated output reactive power $Q_{add}$ of the converter 1 that is returned by the central controller. The central controller herein may be located in a primary converter in the converter 1, ..., and the converter n, or may be located in another device independent of the converter 1, ..., and the converter n. It may be understood that obtaining the compensated output reactive power of the converter 1 through communication can further reduce a calculation workload of the converter 1, to improve processing efficiency of the converter 1.

Then, after the converter 1 determines the compensated output reactive power $Q_{add}$ of the converter 1, the converter 1 determines the actual output reactive power $Q_{final}=Q_{cmd}+Q_{add}$ of the converter 1 based on the target output reactive power $Q_{cmd}$ and the compensated output reactive power $Q_{add}$, and adjusts a differential-mode output voltage of the converter 1, so that final actual output reactive power of the converter 1 is $Q_{final}$.

Other converters (namely, the converter 2, ..., and the converter n) in the power supply system 10 adjust corresponding actual output reactive power in the manner in which the converter 1 adjusts the actual output reactive power of the converter 1, so that the converters in the power supply system 10 indirectly adjust corresponding common-mode output voltages by adjusting corresponding actual output reactive power, to ensure that an absolute value of a difference between common-mode output voltages of any two converters in the power supply system 10 is less than a difference threshold, thereby reducing a difference between common-mode output voltages of the converters and suppressing the circulating current.

It may be understood that in this embodiment, the converter 1 indirectly adjusts the common-mode output voltage of the converter 1 by controlling the compensated output reactive power, to suppress the circulating current. In addition, because a sum of compensated output reactive power of all the converters in the power supply system 10 is less than a first reactive power threshold, total output reactive power of the power supply system 10 is not affected or impact on total output reactive power of the power supply system 10 can be ignored, so that stability of the power supply system 10 can be improved. In addition, compared with a manner in which the common-mode output voltage is directly modified to suppress the circulating current, in this manner, a common-mode voltage injection policy does not need to be modified, so that validity of a DPWM common-mode injection policy can be ensured, thereby reducing a switching loss of the converter 1.

FIG. 4a is a schematic diagram of another structure of a power supply system. As shown in FIG. 4a, a power supply system 10 is a power supply system with a combination of series and parallel connections, and the power supply system 10 includes a first primary converter 11, a first secondary converter 12, ..., and a first secondary converter 1n that correspond to the first primary converter 11, a second primary converter 21, and a second secondary converter 22, ..., and a second secondary converter 2n that correspond to the second primary converter 21, where n is an integer greater than or equal to 2.

A positive input terminal $in_{11+}$ and a negative input terminal $in_{11-}$ of the first primary converter 11 are connected to a direct current power supply $DC_{11}$, a positive input terminal $in_{12+}$ and a negative input terminal $in_{12-}$ of the first secondary converter 12 are connected to a direct current power supply $DC_{12}$, ..., and a positive input terminal $in_{1n+}$ and a negative input terminal $in_{1n-}$ of the first secondary converter 1n are connected to a direct current power supply $DC_{1n}$. Three-phase output terminals $out_{111}$, $out_{112}$, and $out_{113}$ of the first primary converter 11, three-phase output terminals $out_{121}$, $out_{122}$, and $out_{123}$ of the first secondary converter 12, ..., and three-phase output terminals $out_{1n1}$, $out_{1n2}$, and $out_{1n3}$ of the first secondary converter 1n are connected to each other by using corresponding inductors $L_1$ and $L_2+L_{cm}$, and are then connected to an alternating current grid. Optionally, the positive input terminal $in_{11+}$ of the first primary converter 11 is connected to the negative input terminal $in_{11-}$ of the first primary converter 11 by using a positive bus capacitor $C_{111}$ and a negative bus capacitor $C_{112}$, the positive input terminal $in_{12+}$ of the first secondary converter 12 is connected to the negative input terminal $in_{12-}$ of the first secondary converter 12 by using a positive bus capacitor $C_{121}$ and a negative bus capacitor $C_{122}$, ..., and the positive input terminal $in_{1n+}$ of the first secondary converter 1n is connected to the negative input terminal $in_{1n-}$ of the first secondary converter 1n by using a positive bus capacitor $C_{1n1}$ and a negative bus capacitor $C_{1n2}$.

A positive input terminal $in_{21+}$ and a negative input terminal $in_{21-}$ of the second primary converter 21 are connected to a direct current power supply $DC_{21}$, a positive input terminal $in_{22+}$ and a negative input terminal $in_{22-}$ of the second secondary converter 22 are connected to a direct current power supply $DC_{22}$, ..., and a positive input terminal $in_{2n+}$ and a negative input terminal $in_{2n-}$ of the second secondary converter 2n are connected to a direct current power supply $DC_{2n}$. Three-phase output terminals $out_{211}$, $out_{212}$, and $out_{213}$ of the second primary converter 21, three-phase output terminals $out_{221}$, $out_{222}$, and $out_{223}$ of the second secondary converter 22, ..., and three-phase output terminals $out_{2n1}$, $out_{2n2}$, and $out_{2n3}$ of the second secondary converter 2n are connected to each other by using corresponding inductors $L_1$ and $L_2+L_{cm}$, and are then connected to the alternating current grid. Optionally, the positive input terminal $in_{21+}$ of the second primary converter 21 is connected to the negative input terminal $in_{21-}$ of the second primary converter 21 by using a positive bus capacitor $C_{211}$ and a negative bus capacitor $C_{212}$, the positive input terminal $in_{22+}$ of the second secondary converter 22 is connected to the negative input terminal $in_{22-}$ of the second secondary converter 22 by using a positive bus capacitor $C_{221}$ and a negative bus capacitor $C_{222}$, ..., and the positive input terminal $in_{2n+}$ of the second secondary converter 2n is connected to the negative input terminal $in_{2n-}$ of the second secondary converter 2n by using a positive bus capacitor $C_{2n1}$ and a negative bus capacitor $C_{2n2}$.

The negative input terminal $in_{11-}$ of the first primary converter 11 is connected to the positive input terminal $in_{21+}$ of the second primary converter 21, the negative input terminal $in_{12-}$ of the first secondary converter 12 is connected to the positive input terminal $in_{22+}$ of the second secondary converter 22, ..., and the negative input terminal $in_{1n-}$ of the first secondary converter 1n is connected to the positive input terminal $in_{2n+}$ of the second secondary converter 2n.

In an optional implementation, after the power supply system 10 starts to work, output currents of the first primary converter 11, the first secondary converter 12, ..., the first secondary converter 1n, the second primary converter 21, the second secondary converter 22, ..., and the second secondary converter 2n all start to increase from initial currents (for example, 0), and a power scheduling center sends power scheduling instructions to the first primary converter 11, the first secondary converter 12, ..., the first secondary converter 1n, the second primary converter 21, the second secondary converter 22, ..., and the second secondary converter 2n. The first primary converter 11, the first secondary converter 12, ..., the first secondary converter 1n, the second primary converter 21, the second secondary converter 22, . . . , and the second secondary converter 2n receive the power scheduling instructions. The power scheduling instruction carries target output reactive power. Optionally, after receiving a power scheduling instruction, each of the 2n converters may determine target output reactive power of the converter based on a preset mapping relationship between a power scheduling instruction and target output reactive power. Optionally, when an output current of each of the 2n converters starts to increase from 0, the converter may obtain corresponding target output reactive power by reading a corresponding preset configuration parameter. Because all primary converters in the power supply system 10 suppress circulating currents by controlling reactive power in a same manner, and all secondary converters corresponding to the primary converter suppress circulating currents by controlling reactive power in a same manner, the following uses the first primary converter 11 and the first secondary converter 12 as examples for description.

When an output current of the first primary converter 11 starts to increase from an initial current, the first primary converter 11 obtains current three-phase output voltages, namely, a voltage Vout111 of the terminal $out_{111}$, a voltage Vout112 of the terminal $out_{112}$, and a voltage Vout113 of the terminal $out_{113}$, of the first primary converter 11. The first primary converter 11 obtains a reactive power compensation parameter of the first primary converter 11 based on Vout111, Vout112, and Vout113, obtains compensated output reactive power $Q_{add11}$ of the first primary converter 11 based on the reactive power compensation parameter of the first primary converter 11, and further adjusts actual output reactive power $Q_{final11}$ of the first primary converter 11 based on target output reactive power $Q_{cmd}$ and the target output reactive power $Q_{add11}$.

When an output current of the first secondary converter 12 starts to increase from an initial current, the first secondary converter 12 obtains current three-phase output voltages, namely, a voltage Vout121 of the terminal $out_{121}$, a voltage Vout122 of the terminal $out_{122}$, and a voltage Vout123 of the terminal $out_{123}$, of the first secondary converter 12. The first secondary converter 12 obtains a reactive power compensation parameter of the first secondary converter 12 based on Vout121, Vout122, and Vout123, obtains compensated output reactive power $Q_{add12}$ of the first secondary converter 12 based on the reactive power compensation parameter of the first secondary converter 12, and further adjusts actual output reactive power $Q_{final12}$ of the first secondary converter 12 based on target output reactive power $Q_{cmd}$ carried in a power scheduling instruction and the compensated output reactive power $Q_{add12}$.

In an optional embodiment, a manner in which a primary converter and a secondary converter corresponding to the primary converter suppress circulating currents by controlling reactive power in a same manner in this embodiment, and therefore, the first primary converter 11 is used as an example for description in this embodiment.

When the output current of the first primary converter 11 starts to increase from the initial current, the first primary converter 11 obtains Vout111, Vout112, and Vout113, and after obtaining Vout111, Vout112, and Vout113, the first primary converter 11 continues to obtain current three-phase output currents, namely, a current Iout111 of the terminal $out_{111}$, a current Iout112 of the terminal $out_{112}$, and a current Iout113 of the terminal $out_{113}$, of the first primary converter 11. The first primary converter 11 determines a common-mode output voltage Vcmv_11=(Vout111+Vout112+Vout113)/3=$A_{111}$ sin($\omega_{111}$t+$\theta_{111}$) of the first primary converter 11 based on Vout111, Vout112, and Vout113, determines a common-mode output current Icmv_11=(Iout111+Iout112+Iout113)/3=$A_{112}$ sin($\omega_{112}$t+$\theta_{112}$) of the first primary converter 11 based on Iout111, Iout112, and Iout113, and further determines $Q_{add11}$ based on a phase difference $\theta_{112}-\theta_{111}$ between Icmv_11 and Vcmv_11 and Icmv_11. Both $\omega_{111}$ and $\omega_{112}$ are three times a utility frequency, and the utility frequency is a working frequency of the alternating current grid.

After the first primary converter 11 calculates Icmv_11 and Vcmv_11, the first primary converter 11 may determine, based on an effective value (that is, $A_{111}/\sqrt{2}$) of Icmv_11 and a first preset coefficient $k_{cir}$, that an amplitude of $Q_{add11}$ is $|k_{cir}*A_{111}/\sqrt{2}|$, where $k_{cir}$ is a proportional coefficient between the compensated output reactive power and the common-mode output current. When $\theta_{112}-\theta_{111}>0$, it indicates that a phase of Icmv_11 leads a phase of Vcmv_11, in other words, an amplitude of the common-mode output voltage of the first primary converter 11 is less than amplitudes of common-mode output voltages of other converters (namely, the first secondary converter 12, . . . , and the first secondary converter 1n) connected to the three-phase output terminals of the first primary converter 11 in parallel. In this case, the first primary converter 11 determines $Q_{add11}=|k_{cir}*A_{111}/\sqrt{2}|$, so that $Q_{add11}$ is made greater than 0 to increase the actual output reactive power of the first primary converter 11 and further increase the common-mode output voltage of the first primary converter 11. When $\theta_{112}-\theta_{111}<0$, it indicates that a phase of Icmv_11 lags behind a phase of Vcmv_11, in other words, an amplitude of the common-mode output voltage of the first primary converter 11 is greater than amplitudes of common-mode output voltages of the first secondary converter 12, . . . , and the first secondary converter 1n. In this case, the first primary converter 11 determines $Q_{add11}=-|k_{cir}*A_{111}/\sqrt{2}|$, so that $Q_{add11}$ can be made less than 0 to reduce the actual output reactive power of the first primary converter 11 and further reduce the common-mode output voltage of the first primary converter 11.

In this manner, the compensated output reactive power is determined based on the common-mode output voltage and the common-mode output current of the first primary converter 11. Therefore, the first primary converter 11 does not need to communicate with another converter or another device, to effectively avoid a case in which the compensated output reactive power cannot be determined due to a communication fault, thereby improving stability of the first primary converter 11 during working and achieving high applicability.

Then the first primary converter 11 determines the actual output reactive power $Q_{final11}=Q_{cmd}+Q_{add11}$ of the first primary converter 11 based on the target output reactive power $Q_{cmd}$ and the compensated output reactive power $Q_{add11}$ and adjusts a differential-mode output voltage of the first primary converter 11, so that final actual output reactive power of the first primary converter 11 is $Q_{final11}$.

It may be understood that each converter in the power supply system 10 may determine, based on a phase difference between a common-mode output current and a common-mode output voltage of the converter, a comparison result of an amplitude of the common-mode output voltage of the converter and an amplitude of a common-mode output voltage of another converter connected to three-phase output terminals of the converter in parallel, control compensated output reactive power based on the comparison result, and further indirectly adjust, by controlling the compensated output reactive power, the common-mode output voltage to suppress a circulating current. In addition, because a sum of compensated output reactive power of all the converters in the power supply system 10 is less than a first reactive power threshold, total output reactive power of the power supply system 10 is not affected or impact on total output reactive power of the power supply system 10 can be ignored, so that stability of the power supply system 10 can be improved. In addition, in this embodiment, each converter indirectly adjusts the common-mode output voltage of the converter by controlling the compensated output reactive power, to suppress a circulating current. Therefore, compared with a manner in which the common-mode output voltage is directly modified to suppress the circulating current, in this manner, a common-mode voltage injection policy does not need to be modified, so that validity of a DPWM common-mode injection policy can be ensured, thereby reducing a switching loss of each converter.

In another optional embodiment, when the output current of the first secondary converter 12 starts to increase from the initial current, the first secondary converter 12 obtains Vout121, Vout122, and Vout123, and after obtaining Vout121, Vout122, and Vout123, the first secondary converter 12 continues to obtain a current input voltage, namely, a voltage Vin12 between the terminal $in_{12+}$ and the terminal $in_{12-}$, of the first secondary converter 12. The first secondary converter 12 calculates an amplitude $Vamp\_12 = \sqrt{2(Vout121^2 + Vout122^2 + Vout123^2)/3}$ of the three-phase output voltages based on Vout121, Vout122, and Vout123, calculates a modulation ratio $m_{12} = 2Vamp\_12/Vin12$ of the first secondary converter 12 based on Vin12 and Vamp_12, and further determines the compensated output reactive power $Q_{add12}$ based on $m_{12}$.

When the output current of the first primary converter 11 starts to increase from the initial current, the first primary converter 11 obtains Vout111, Vout112, and Vout113, and after obtaining Vout111, Vout112, and Vout113, the first primary converter 11 continues to obtain a current input voltage, namely, a voltage Vin11 between the terminal $in_{11+}$ and the terminal $in_{11-}$, of the first primary converter 11. The first primary converter 11 calculates an amplitude $Vamp\_11 = \sqrt{2(Vout111^2 + Vout112^2 + Vout113^2)/3}$ of the three-phase output voltages based on Vout111, Vout112, and Vout113, calculates a modulation ratio $m_{11} = 2Vamp\_11/Vin11$ of the first primary converter 11 based on Vin11 and Vamp_11, and further determines the compensated output reactive power $Q_{add11}$ based on $m_{11}$.

After calculating the modulation ratio $m_{12}$ of the first secondary converter 12, the first secondary converter 12 may send a modulation ratio average value obtaining request to the first primary converter 11 in which a central controller is disposed. The modulation ratio average value obtaining request carries the modulation ratio $m_{12}$ of the first secondary converter 12. The first primary converter 11 receives modulation ratio average value obtaining requests sent by the first secondary converter 12, . . . , and the first secondary converter 1n, calculates a first modulation ratio $m_{avg} = (m_{11} + m_{12} + \ldots + m_{1n})/n$ based on the calculated modulation ratio $m_{11}$ of the first primary converter 11 and the modulation ratio $m_{12}$ of the first secondary converter 12, . . . , and a modulation ratio $m_{1n}$ of the first secondary converter 1n that are carried in the modulation ratio average value obtaining requests sent by the first secondary converter 12, . . . , and the first secondary converter 1n, and returns $m_{avg}$ to the first secondary converter 12, . . . , and the first secondary converter 1n. The first secondary converter 12 receives the first modulation ratio $m_{avg}$ returned by the first primary converter 11.

Optionally, after calculating a corresponding modulation ratio, each converter may obtain the first modulation ratio by communicating with the central controller. The following uses the first primary converter 11 as an example for description. After calculating the modulation ratio $m_1$ of the first primary converter 11, the first primary converter 11 sends a modulation ratio average value obtaining request to the central controller. The modulation ratio average value obtaining request carries the modulation ratio $m_{11}$ of the first primary converter 11. Then the central controller receives modulation ratio average value obtaining requests sent by the first primary converter 11, . . . , and the first secondary converter 1n, calculates the first modulation ratio $m_{avg} = (m_{11} + m_{12} + \ldots + m_{1n})/n$ based on the modulation ratio $m_{11}$ of the first primary converter 11, . . . , and the modulation ratio $m_{1n}$ of the first secondary converter 1n that are carried in the modulation ratio average value obtaining requests sent by the first primary converter 11, . . . , and the first secondary converter 1n, and returns $m_{avg}$ to the first primary converter 11, . . . , and the first secondary converter 1n. The first primary converter 11 receives the first modulation ratio $m_{avg}$ returned by the central controller. The central controller herein may be located in another device independent of the first primary converter 11, . . . , and the first secondary converter 1n. It may be understood that obtaining the first modulation ratio through communication can reduce a calculation workload of the first primary converter 11, to improve processing efficiency of the first primary converter 11.

Optionally, the first modulation ratio may be preset in each converter, to avoid a case in which the first modulation ratio cannot be determined due to a communication fault, so that stability of the converter during working is improved and applicability is high.

Then, after obtaining the first modulation ratio $m_{avg}$, the first primary converter 11 calculates a modulation ratio deviation $\Delta m_{11} = m_{avg} - m_{11}$ between $m_{avg}$ and mu and determines that an amplitude of $Q_{add11}$ is $|k_{mod}^* \Delta m_{11}|$ based on $\Delta m_{11}$ and a second preset coefficient $k_{mod}$, where $k_{mod}$ is a proportional coefficient between the compensated output reactive power and the modulation ratio deviation. When $\Delta m_{11} > 0$, it indicates that an amplitude of a common-mode output voltage of the first primary converter 11 is less than amplitudes of common-mode output voltages of other converters (the first secondary converter 12, . . . , and the first secondary converter 1n) connected to the three-phase output terminals of the first primary converter 11 in parallel. In this case, the first primary converter 11 determines $Q_{add11} = |k_{mod}^* \Delta m_{11}|$, so that $Q_{add11}$ can be made greater than 0 to increase the actual output reactive power of the first primary converter 11 and further increase the common-mode output voltage of the first primary converter 11. When $\Delta m_{11} < 0$, it indicates that an amplitude of a common-mode output voltage of the first primary converter 11 is greater than amplitudes of common-mode output voltages of other converters. In this case, the first primary converter 11 determines $Q_{add11} = -|k_{mod}^* \Delta m_{11}|$, so that $Q_{add11}$ can be made less than 0 to reduce the actual output reactive power of the first primary converter 11 and further reduce the common-mode output voltage of the first primary converter 11.

In addition, after obtaining the first modulation ratio $m_{avg}$, the first secondary converter 12 calculates a modulation ratio deviation $\Delta m_{12} = m_{avg} - m_{12}$ between $m_{avg}$ and $m_{12}$ and determines that an amplitude of $Q_{add12}$ is $|k_{mod}*\Delta m_{12}|$ based on $\Delta m_{12}$ and a second preset coefficient $k_{mod}$, where $k_{mod}$ is a proportional coefficient between the compensated output reactive power and the modulation ratio deviation. When $\Delta m_{12} > 0$, it indicates that an amplitude of a common-mode output voltage of the first secondary converter 12 is less than amplitudes of common-mode output voltages of other converters (namely, the first primary converter 11, the first secondary converter 13, ..., and the first secondary converter 1n) connected to the three-phase output terminals of the first secondary converter 12 in parallel. In this case, the first secondary converter 12 determines $Q_{add12} = |k_{mod}*\Delta m_{12}|$, so that $Q_{add12}$ can be made greater than 0 to increase the actual output reactive power of the first secondary converter 12 and further increase the common-mode output voltage of the first secondary converter 12. When $\Delta m_{12} < 0$, it indicates that an amplitude of a common-mode output voltage of the first secondary converter 12 is greater than amplitudes of common-mode output voltages of other converters. In this case, the first secondary converter 12 determines $Q_{add12} = -|k_{mod}*\Delta m_{12}|$, so that $Q_{add12}$ can be made less than 0 to reduce the actual output reactive power of the first secondary converter 12 and further reduce the common-mode output voltage of the first secondary converter 12.

It may be understood that each converter may determine, based on a modulation ratio deviation between the modulation ratio average value and a modulation ratio of the converter, a comparison result of an amplitude of a common-mode output voltage of the converter and an amplitude of a common-mode output voltage of another converter connected to three-phase output terminals of the converter in parallel, control compensated output reactive power based on the comparison result, and further indirectly adjust the common-mode output voltage by controlling the compensated output reactive power, to suppress a circulating current. Because the compensated output reactive power in this manner is determined based on the modulation ratio deviation between the modulation ratio average value and the modulation ratio of the converter, accuracy of calculating the compensated output reactive power by the converter can be effectively improved, the circulating current can be further effectively suppressed, stability of the power supply system 10 can be further improved, and applicability is higher.

Optionally, each converter may obtain compensated output reactive power of the converter by communicating with the central controller. In this manner, a primary converter and a secondary converter corresponding to the primary converter obtain corresponding compensated output reactive power in a same manner. The following uses the first primary converter 11 as an example for description.

After calculating a modulation ratio mu of the first primary converter 11, the first primary converter 11 sends a compensated reactive power obtaining request to the central controller. The compensated reactive power obtaining request carries the modulation ratio $m_{11}$ of the first primary converter 11. After receiving compensated reactive power obtaining requests sent by the first primary converter 11, the first secondary converter 12, ..., and the first secondary converter 1n, the central controller calculates a first modulation ratio $m_{avg} = (m_{11} + m_{12} + ... + m_{1n})/n$ based on the modulation ratio $m_{11}$ of the first primary converter 11, a modulation ratio $m_{12}$ of the first secondary converter 12, ..., and a modulation ratio $m_{1n}$ of the first secondary converter 1n that are carried in the compensated reactive power obtaining requests sent by the first primary converter 11, the first secondary converter 12, ..., and the first secondary converter 1n, and calculates compensated output reactive power of the first primary converter 11, the first secondary converter 12, ..., and the first secondary converter 1n based on a second preset coefficient $k_{mod}$ and modulation ratio deviations, namely, $\Delta m_{11}, ..., $ and $\Delta m_{1n}$, between the first modulation ratio $m_{avg}$ and the modulation ratio $m_{11}$ of the first primary converter 11, ..., and the modulation ratio $m_{1n}$ of the first secondary converter 1n. Herein, for an implementation in which the central controller determines the compensated output reactive power of each converter based on a modulation ratio deviation of each converter and the second preset coefficient $k_{mod}$, refer to the manner in which the first primary converter 11 determines $Q_{add11}$ based on $\Delta m_{11}$ and the second preset coefficient $k_{mod}$ in the previous embodiment. Details are not described herein again. Then the central controller respectively returns the compensated output reactive power of the first primary converter 11, the first secondary converter 12, ..., and the first secondary converter 1n to the first primary converter 11, the first secondary converter 12, ..., and the first secondary converter 1n. The first primary converter 11 receives the compensated output reactive power $Q_{add11}$ of the first primary converter 11 that is returned by the central controller. The central controller herein may be located in another device independent of the first primary converter 11, the first secondary converter 12, ..., and the first secondary converter 1n. It may be understood that obtaining the compensated output reactive power of the first primary converter 11 through communication can further reduce a calculation workload of the first primary converter 11, to improve processing efficiency of the first primary converter 11.

Then, after the first primary converter 11 determines the compensated output reactive power $Q_{add11}$ of the first primary converter 11, the first primary converter 11 determines the actual output reactive power $Q_{final11} = Q_{cmd} + Q_{add11}$ of the first primary converter 11 based on the target output reactive power $Q_{cmd}$ and the compensated output reactive power $Q_{add11}$, and adjusts a differential-mode output voltage of the first primary converter 11, so that final actual output reactive power of the first primary converter 11 is $Q_{final11}$.

In addition, after the first secondary converter 12 determines the compensated output reactive power $Q_{add12}$ of the first secondary converter 12, the first secondary converter 12 determines the actual output reactive power $Q_{final12} = Q_{cmd} + Q_{add12}$ of the first secondary converter 12 based on the target output reactive power $Q_{cmd}$ and the compensated output reactive power $Q_{add12}$, and adjusts a differential-mode output voltage of the first secondary converter 12, so that final actual output reactive power of the first secondary converter 12 is $Q_{final12}$.

Other secondary converters in the power supply system 10 adjust corresponding actual output reactive power in the manner in which the first secondary converter 12 adjusts the actual output reactive power of the first secondary converter 12, so that the converters in the power supply system 10 indirectly adjust corresponding common-mode output voltages by adjusting corresponding actual output reactive power, to ensure that an absolute value of a difference between common-mode output voltages of any two converters in the power supply system 10 is less than a difference threshold, thereby reducing a difference between common-mode output voltages of the converters and suppressing the circulating current.

It may be understood that in this embodiment, each converter indirectly adjusts a common-mode output voltage of the converter by controlling compensated output reactive power, to suppress a circulating current. In addition, because a sum of compensated output reactive power of all the converters in the power supply system 10 is less than a first reactive power threshold, total output reactive power of the power supply system 10 is not affected or impact on total output reactive power of the power supply system 10 can be ignored, so that stability of the power supply system 10 can be improved. In addition, compared with a manner in which the common-mode output voltage is directly modified to suppress the circulating current, in this manner, a common-mode voltage injection policy does not need to be modified, so that validity of a DPWM common-mode injection policy can be ensured, thereby reducing a switching loss of each converter.

Further, the embodiments may be further applicable to a power supply system, shown in FIG. 4b, with a combination of series and parallel connections. As shown in FIG. 4b, a negative input terminal $in_{11-}$ of a first primary converter 11 is connected to a positive input terminal $in_{22+}$ of a second secondary converter 22, a negative input terminal $in_{12-}$ of a first secondary converter 12 is connected to a positive input terminal $in_{21+}$ of a second primary converter 21, and a negative input terminal $in_{13-}$ of a first secondary converter 13 is connected to a positive input terminal $in_{23+}$ of a second secondary converter 23, . . . , and a negative input terminal $in_{1n-}$ of a first secondary converter 1n is connected to a positive input terminal $in_{2n+}$ of a second secondary converter 2n. It may be understood that a reactive power control manner of each converter in the power supply system 10 shown in FIG. 4b is consistent with a reactive power control manner of each converter in the power supply system 10 shown in FIG. 4a. Details are not described herein again.

Figure 5:
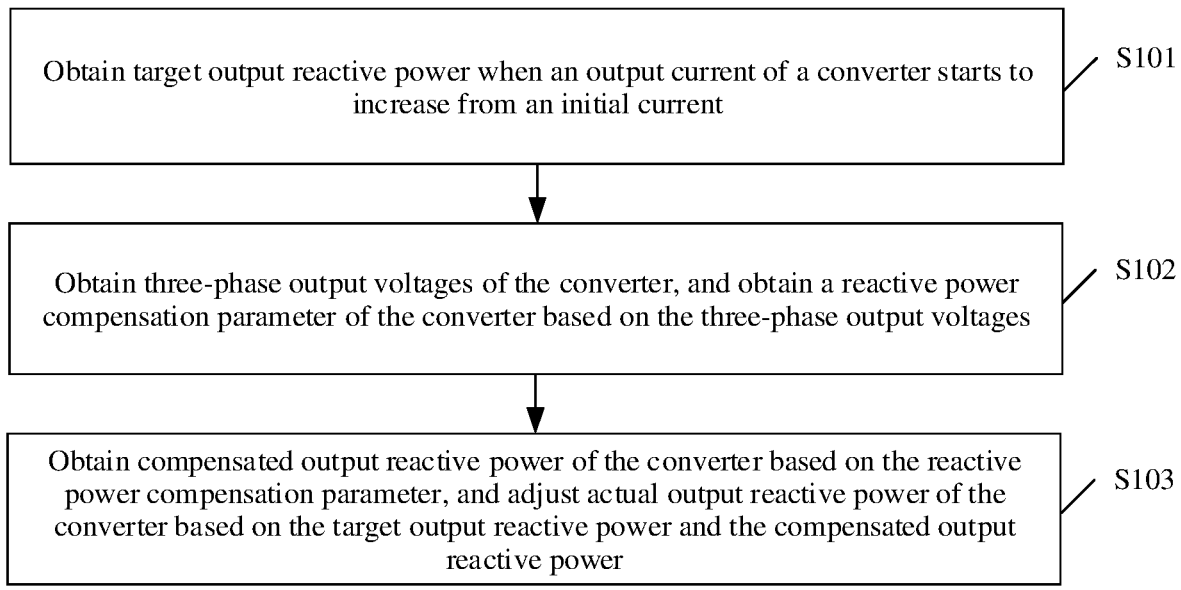
FIG. 5 is a schematic flowchart of a circulating current suppression method of a converter.

FIG. 5 is a schematic flowchart of a circulating current suppression method of a converter. The circulating current suppression method of the converter provided in this embodiment may be applicable to all converters in the power supply system 10 shown in FIG. 3 to FIG. 4b. The circulating current suppression method of the converter may include the following steps.

S101: Obtain target output reactive power when an output current of the converter starts to increase from an initial current.

In an optional implementation, after the power supply system starts to work, an output current of each converter in the power supply system starts to increase from an initial current, and a power scheduling center sends a power scheduling instruction to each converter. Each converter receives the power scheduling instruction. The power scheduling instruction carries target output reactive power.

In another optional implementation, after receiving a power scheduling instruction, each converter may determine target output reactive power of the converter based on a preset mapping relationship between a power scheduling instruction and target output reactive power.

In still another optional implementation, when an output current of each converter starts to increase from 0, the converter may obtain corresponding target output reactive power by reading a corresponding preset configuration parameter.

S102: Obtain three-phase output voltages of the converter and obtain a reactive power compensation parameter of the converter based on the three-phase output voltages.

The reactive power compensation parameter of the converter includes a phase difference between a common-mode output current and a common-mode output voltage of the converter or a modulation ratio of the converter.

In an optional implementation, when the output current of the converter starts to increase from the initial current, the converter starts to obtain the current three-phase output voltages of the converter and three-phase output currents of the converter. The converter determines the common-mode output current of the converter based on the three-phase output currents, determines the common-mode output voltage based on the three-phase output voltages, and further determines a difference between a phase of the common-mode output current and a phase of the common-mode output voltage as the phase difference.

In another optional implementation, when the output current of the converter starts to increase from the initial current, the converter starts to obtain the current three-phase output voltages of the converter and an input voltage of the converter and determines the modulation ratio of the converter based on the input voltage and an amplitude of the three-phase output voltages.

S103: Obtain compensated output reactive power of the converter based on the reactive power compensation parameter and adjust actual output reactive power of the converter based on the target output reactive power and the compensated output reactive power.

In an optional implementation, the converter determines the compensated output reactive power of the converter based on the phase difference and the common-mode output current or determines the compensated output reactive power of the converter based on the modulation ratio of the converter. Further, the converter determines a sum of the target output reactive power and the compensated output reactive power as the actual output reactive power and adjusts a differential-mode output voltage of the converter, so that final actual output reactive power of the converter is the actual output reactive power.

During implementation, for more operations performed by the converter in the circulating current suppression method of the converter, refer to the implementations performed by each converter in the power supply system 10 shown in FIG. 3 to FIG. 4b. Details are not described herein again.

The converter may indirectly adjust the common-mode output voltage of the converter by controlling the compensated output reactive power, to ensure that an absolute value of a difference between common-mode output voltages of any two converters in the converter and other converters connected to output terminals of the converter in parallel is less than a difference threshold, thereby suppressing a circulating current and improving stability of the power supply system. In addition, compared with a manner in which the common-mode output voltage is directly modified to suppress the circulating current, in this manner, a common-mode voltage injection policy does not need to be modified, so that validity of a DPWM common-mode injection policy can be ensured, thereby reducing a switching loss of each converter and achieving high applicability.

The foregoing descriptions are merely implementations, but are not intended as limiting. Any variation or replacement readily figured out by a person skilled in the art shall fall within the scope of the embodiments.

What is claimed is:

1. A power supply system, wherein the power supply system comprises at least two converters, an input terminal of the converter is coupled to a direct current power supply, and three-phase output terminals of the at least two converters are coupled to each other, and are then connected to an alternating current grid; and the converter is configured to:

obtain target output reactive power when an output current of the converter starts to increase from an initial current;
obtain three-phase output voltages of the converter;
obtain a reactive power compensation parameter of the converter based on the three-phase output voltages;
obtain compensated output reactive power of the converter based on the reactive power compensation parameter; and
adjust actual output reactive power of the converter based on the target output reactive power and the compensated output reactive power, so that an absolute value of a difference between common-mode output voltages of any two of the at least two adjusted converters is less than a difference threshold, wherein the reactive power compensation parameter comprises a phase difference between a common-mode output current and a common-mode output voltage of the converter or a modulation ratio of the converter; wherein the modulation ratio of the converter is determined based on a input voltage of the converter and an amplitude of the three-phase output voltages; and wherein the converter is further configured to:
obtain a first modulation ratio; and
obtain the compensated output reactive power based on a modulation ratio deviation between the first modulation ratio and the modulation ratio of the converter, wherein the first modulation ratio is an average value of modulation ratios of the at least two converters.

2. The power supply system according to claim 1, wherein the reactive power compensation parameter is the phase difference between the common-mode output current and the common-mode output voltage of the converter; and the converter is further configured to:
obtain three-phase output currents of the converter;
obtain the common-mode output current of the converter based on the three-phase output currents;
obtain the common-mode output voltage of the converter based on the three-phase output voltages; and
determine a difference between a phase of the common-mode output current and a phase of the common-mode output voltage as the phase difference.

3. The power supply system according to claim 2, wherein the converter is further configured to obtain the compensated output reactive power based on the phase difference and the common-mode output current.

4. The power supply system according to claim 3, wherein the converter is further configured to:
obtain an amplitude of the compensated output reactive power based on an effective value of the common-mode output current; and
when the phase difference is greater than 0, determine that the compensated output reactive power is greater than 0; or
when the phase difference is less than 0, determine that the compensated output reactive power is less than 0.

5. The power supply system according to claim 1, wherein the converter is further configured to:
send a compensated reactive power obtaining request to a central controller, wherein the compensated reactive power obtaining request carries the modulation ratio of the converter; and
receive the compensation output reactive power returned by the central controller.

6. The power supply system according to claim 1, wherein the converter is further configured to:
obtain an amplitude of the compensated output reactive power based on an absolute value of the modulation ratio deviation; and
when the modulation ratio deviation is greater than 0, determine that the compensated output reactive power is greater than 0; or
when the modulation ratio deviation is less than 0, determine that the compensated output reactive power is less than 0.

7. The power supply system according to claim 1, wherein the converter is further configured to:
receive a modulation ratio sent by another converter in the at least two converters; and
obtain the first modulation ratio based on the modulation ratio of the converter and the modulation ratio sent by the another converter.

8. The power supply system according to claim 7, wherein the converter is further configured to send the first modulation ratio to the another converter after obtaining the first modulation ratio.

9. The power supply system according to claim 1, wherein the converter is further configured to:
send a modulation ratio average value obtaining request to the central controller, wherein the modulation ratio average value obtaining request carries the modulation ratio of the converter; and
receive the first modulation ratio returned by the central controller.

10. The power supply system according to claim 5, wherein the central controller is located in a primary converter in the at least two converters.

11. The power supply system according to claim 1, wherein positive input terminals of the at least two converters are mutually coupled, and negative input terminals of the at least two converters are mutually coupled.

12. The power supply system according to claim 1, wherein the at least two converters comprise a first primary converter and n first secondary converters corresponding to the first primary converter, the power supply system further comprises a second primary converter and n second secondary converters corresponding to the second primary converter, a negative input terminal of one of the first primary converter and the n first secondary converters is connected to a positive input terminal of one of the second primary converter and the n second secondary converters, three-phase output terminals of the first primary converter and three-phase output terminals of the first secondary converters are coupled, and are then connected to the alternating current grid, three-phase output terminals of the second primary converter and three-phase output terminals of the second secondary converters are coupled, and are then connected to the alternating current grid, and n is a positive integer.

13. A converter, wherein an input terminal of the converter is coupled to a direct current power supply, and three-phase output terminals of the converter and three-phase output terminals of at least one converter are mutually coupled, and are then connected to an alternating current grid; and the converter is configured to:
obtain target output reactive power when an output current of the converter starts to increase from an initial current;
obtain three-phase output voltages of the converter;
obtain a reactive power compensation parameter of the converter based on the three-phase output voltages;

obtain compensated output reactive power of the converter based on the reactive power compensation parameter; and adjust actual output reactive power of the converter based on the target output reactive power and the compensated output reactive power, wherein the reactive power compensation parameter comprises a phase difference between a common-mode output current and a common-mode output voltage of the converter or a modulation ratio of the converter; wherein the modulation ratio of the converter is determined based on a input voltage of the converter and an amplitude of the three-phase output voltages; and wherein the converter is further configured to:

obtain a first modulation ratio; and obtain the compensated output reactive power based on a modulation ratio deviation between the first modulation ratio and the modulation ratio of the converter, wherein the first modulation ratio is an average value of modulation ratios of at least two converters.

14. The converter according to claim 13, wherein the reactive power compensation parameter is the phase difference between the common-mode output current and the common-mode output voltage of the converter, and the converter is further configured to:

obtain three-phase output currents of the converter;

obtain the common-mode output current of the converter based on the three-phase output currents;

obtain the common-mode output voltage of the converter based on the three-phase output voltages;

determine a difference between a phase of the common-mode output current and a phase of the common-mode output voltage as the phase difference;

obtain the compensated output reactive power based on the phase difference and the common-mode output current;

obtain an amplitude value of the compensated output reactive power based on an effective value of the common-mode output current; and when the phase difference is greater than 0, determine that the compensated output reactive power is greater than 0; or when the phase difference is less than 0, determine that the compensated output reactive power is less than 0.

15. The converter according to claim 13, wherein the reactive power compensation parameter is the modulation ratio of the converter, and the converter is further configured to:

obtain an amplitude of the compensated output reactive power based on an absolute value of the modulation ratio deviation; and when the modulation ratio deviation is greater than 0, determine that the compensated output reactive power is greater than 0; or when the modulation ratio deviation is less than 0, determine that the compensated output reactive power is less than 0.

16. A circulating current suppression method of a converter, wherein an input terminal of a converter is coupled to a direct current power supply, and three-phase output terminals and three-phase output terminals of at least one converter are mutually coupled, and are then connected to an alternating current grid; and the method comprises:

obtaining target output reactive power when an output current of the converter starts to increase from an initial current;

obtaining three-phase output voltages of the converter;

obtaining a reactive power compensation parameter of the converter based on the three-phase output voltages;

obtaining compensated output reactive power of the converter based on the reactive power compensation parameter, and adjusting actual output reactive power of the converter based on the target output reactive power and the compensated output reactive power, wherein the reactive power compensation parameter comprises a phase difference between a common-mode output current and a common-mode output voltage of the converter or a modulation ratio of the converter; wherein the modulation ratio of the converter is determined based on a input voltage of the converter and an amplitude of the three-phase output voltages; and wherein the converter is further configured to:

obtain a first modulation ratio; and obtain the compensated output reactive power based on a modulation ratio deviation between the first modulation ratio and the modulation ratio of the converter, wherein the first modulation ratio is an average value of modulation ratios of at least two converters.

17. The circulating current suppression method of a converter method according to claim 16, wherein the reactive power compensation parameter is the phase difference between the common-mode output current and the common-mode output voltage of the converter, and obtaining the reactive power compensation parameter of the converter based on the three-phase output voltages further comprises:

obtaining three-phase output currents of the converter;

obtaining the common-mode output current of the converter based on the three-phase output currents; and obtaining a common-mode output voltage of the converter based on the three-phase output voltages;

determining a difference between a phase of the common-mode output current and a phase of the common-mode output voltage as the phase difference, and obtaining the compensated output reactive power of the converter based on the reactive power compensation parameter further comprises:

obtaining the compensated output reactive power based on the phase difference and the common-mode output current; and obtaining the compensated output reactive power based on the phase difference and the common-mode output current further comprises:

obtaining an amplitude of the compensated output reactive power based on an effective value of the common-mode output current; and when the phase difference is greater than 0, determining that the compensated output reactive power is greater than 0; or when the phase difference is less than 0, determining that the compensated output reactive power is less than 0.

18. The circulating current suppression method of a converter method according to claim 16, wherein the reactive power compensation parameter is the modulation ratio of the converter, and obtaining the reactive power compensation parameter of the converter based on the three-phase output voltages further comprises:

obtaining the compensated output reactive power of the converter based on the reactive power compensation parameter further comprises:

obtaining the compensated output reactive power based on the modulation ratio deviation between the first modulation ratio and the modulation ratio of the converter further comprises:

obtaining an amplitude of the compensated output reactive power based on an absolute value of the modulation ratio deviation; and when the modulation ratio deviation is greater than 0, determining that the compensated output reactive power is greater than 0; or when the modulation ratio deviation is less than 0, determining that the compensated output reactive power is less than 0.

\* \* \* \* \*

UNITED STATES PATENT AND TRADEMARK OFFICE
CERTIFICATE OF CORRECTION

PATENT NO. : 12,160,106 B2
APPLICATION NO. : 17/964121
DATED : December 3, 2024
INVENTOR(S) : Xinyu Yu et al.

Page 1 of 1

It is certified that error appears in the above-identified patent and that said Letters Patent is hereby corrected as shown below:

In the Claims

Column 24, Claim 12, Line 38, please change from "The power supply system according to claim 1," to "The power supply system according to claim 6".

Signed and Sealed this
Twenty-fifth Day of March, 2025

Coke Morgan Stewart
*Acting Director of the United States Patent and Trademark Office*